Patented Dec. 5, 1922.

1,437,951

UNITED STATES PATENT OFFICE.

ROBERT A. ARCHIBALD, OF OAKLAND, CALIFORNIA; T. C. VAN NESS, JR., EXECUTOR OF SAID ROBERT A. ARCHIBALD, DECEASED.

SPLEEN EXTRACT.

No Drawing. Application filed September 22, 1920. Serial No. 411,991.

*To all whom it may concern:*

Be it known that I, ROBERT A. ARCHIBALD, a citizen of the United States, residing at Oakland, in the county of Alameda and State of California, have invented a certain new and useful Improvement in Spleen Extracts, of which the following is a full, clear, and exact description.

An object of the invention is to provide a liquid or extract which when injected under the skin of a person or animal having an infection or any infectious disorder, toxemia, pathological condition or malady will produce a marked curative effect on the pathological condition, toxemia, disorder or malady or remove the infection, and furthermore when injected under the skin of an individual having malaria, tuberculosis or other acute and chronic diseases where vital resistances are lower than normal, will increase such resistances.

The invention possesses innumerable advantages in the treatment and cure of infections and pathological conditions, but I am not sufficiently certain as to the effects produced in the body by the inoculation of the extract to make an absolute statement as to all the biological, bacteriological or physiological changes which occur after the inoculation. I am of the opinion the extract in some manner increases the number of red blood cells particularly the young forms and coincidentally increases the hemoglobin content of the blood. It also increases the number of, the activity, and the capacity of the leucocytes or white corpuscles of the blood, particularly the polymorphonuclear and transitional varieties of leucocytes. The leucocytes prey upon and take into their substance bacteria and other micro-organisms and their products within the blood and tissues and if their number and activity are increased they operate to remove the infection or toxemia.

I am further of the opinion that the action of the polymorphonuclear types of leucocytes whose number and activity are increased by the injection of the extract is particularly to control various infections and toxemias. These varieties of leucocytes produce enzymes of marked activity which cause a rapid and complete digestion and resolution of partially organized exudates and newly formed pathological tissues.

I am further of the opinion that the extract in some manner greatly increases the number and activity of the blood platelets with a coincident increase of the coagulability of the blood.

Whatever the action of the extract is, I know from experiment and clinical application that it is extremely useful in the treatment of infections, especially chronic infections, such as malaria, tuberculosis, and diseases characterized by the formation of inflammatory exudates and proliferation of new tissues. It is also extremely useful in controlling hemorrhages incidental to surgical operations or hemorrhages due to pathological conditions.

The extract is not necessarily limited in its production to the exact process herein described but may be produced by modifications of such process. The extract is made from the spleens of such domestic animals as the ox, hog or sheep, the glands being in a normal condition free from infections or disease of any sort. The spleens are removed from the animal immediately after it is killed under rigid aseptic conditions.

When the glands reach the laboratory they are stripped of their fat and connective tissue capsules.

The glands are then ground in a meat grinder and to the resulting pulp is added sterile distilled water in the proportion of five volumes of water to one of gland pulp for the purpose of dilution. Sufficient ten per cent phenol solution or other preservative is added to make the whole a 0.3 per cent phenol solution, for the purpose of preserving the emulsion during subsequent operations.

The mixture or emulsion is then exposed to a temperature of 58 cent. in a water bath for one hour for the purpose of destroying the antiferments it may contain. The mixture is then placed in an incubator and exposed to a temperature of 37 cent. until autodigestion or lysis of the spleen cells is complete. After the spleen cells have undergone lysis or have been broken up, their protoplasmic contents have been liberated, and their soluble elements have been extracted a sufficient amount of ten per cent. solution of acetic acid, is added to make the whole about 0.07 per cent. acetic acid for the purpose of precipitating the solid and semi-solid proteins from the mixture. It is then filtered through filter paper for the purpose of removing the coarser solids from the mixture. Then sufficient phenol or other preservative is added to make the whole 0.5 per cent phenol solution for preservative purposes.

The acidity is then determined and sufficient normal sodium hydrate solution is added to the emulsion to neutralize the acidity produced previously by the addition of the acetic acid solution and the mixture is then filtered through a Berkefeld filter for the purpose of removing all solid and semi-solid débris. The resulting product being a watery clear fluid, is put in ampuls of varying capacity, the ampuls are sealed and together with their contents are exposed to a temperature of 58 cent. for one hour for the purpose of sterilizing.

Each lot of spleen extract is carefully examined bacteriologically to determine if it is sterile, and its ability to produce certain blood changes is determined by the inoculation of definite quantities into experimental animals, such as guinea pigs and rabbits.

The effect of spleen extract when injected subcutaneously is to increase the number and activity of red blood cells, particularly the young forms and coincidentally increases the hemoglobin content of the blood, also to increase the number of leucocytes especially the polymorphonuclear and transitionals which are believed to be the most active of all the white cells in the control of chronic infectious diseases, malignant and benign tissue changes, the resolution of inflammatory exudates and other pathological conditions; also to increase the number of blood platelets and to considerably increase the coagulability of the blood, thereby controlling hemorrhages both surgical and pathological in character.

I claim:

An extract, in soluble form, neutral in reaction, which is obtained from the liberated protoplasm of digested normal spleen cells in permanent solution and possessing the characteristics when injected parenterally of stimulating the production of an increased number and activity of red blood cells and quantity of hemoglobin, also stimulating the production of a leucocytosis and increasing the activity of the individual leucocytes particularly the polymorphonuclear and transitional types of leucocytes and stimulating the production of blood platelets and increasing their activity.

In testimony whereof, I have hereunto set my hand at Oakland, California, this 16th day of September 1920.

ROBERT A. ARCHIBALD.